(12) United States Patent
Sacco et al.

(10) Patent No.: US 8,538,721 B2
(45) Date of Patent: Sep. 17, 2013

(54) METHOD FOR DIAGNOSING A CATALYTIC DEVICE OF AN ENGINE EXHAUST GAS AFTER-TREATMENT SYSTEM

(75) Inventors: Nicola Sacco, Manfredonia (IT); Alessandra Chianale, Alpignano (IT); Igor Zanetti, Verrayes (DE)

(73) Assignee: GM Global Technology Operations LLC, Detroit, MI (US)

( * ) Notice: Subject to any disclaimer, the term of this patent is extended or adjusted under 35 U.S.C. 154(b) by 253 days.

(21) Appl. No.: 12/947,701

(22) Filed: Nov. 16, 2010

(65) Prior Publication Data

US 2011/0153260 A1    Jun. 23, 2011

(30) Foreign Application Priority Data

Nov. 16, 2009    (GB) .................................. 0920019.7

(51) Int. Cl.
*G01M 15/00*    (2006.01)

(52) U.S. Cl.
USPC .......................................... 702/130

(58) Field of Classification Search
USPC .......................................... 702/130
See application file for complete search history.

(56) References Cited

U.S. PATENT DOCUMENTS

2004/0025580 A1* 2/2004 Webb et al. .................. 73/118.1

FOREIGN PATENT DOCUMENTS

| DE | 10055528 A1 | 5/2001 |
| EP | 1067279 A2 | 1/2001 |
| EP | 1544431 A1 | 6/2005 |
| FR | 2878901 A1 | 6/2006 |

OTHER PUBLICATIONS

Sakae Toyoda, Isotopomeric characterization of N2O produced, consumed, and emitted by automobiles, Rapid Commun. Mass Spectrom. 2008; 22: 603-612, p. 603-612.*
British Patent Office, British Search Report for Application No. GB0920019.7, dated Jan. 27, 2010.

* cited by examiner

*Primary Examiner* — Tung S Lau
(74) *Attorney, Agent, or Firm* — Ingrassia Fisher & Lorenz, P.C.

(57) ABSTRACT

A method is provided for estimating an aging index of the catalytic device. There estimation of the aging index includes, but is not limited to determining the catalytic device operating temperature, determining an aging factor as a function of at least the determined operating temperature, determining the time period spent by the catalytic device at the determined operating temperature, calculating a contributing aging coefficient as a function of the aging factor and the time period, and increasing a cumulative aging parameter by adding the contributing aging coefficient.

33 Claims, 4 Drawing Sheets

METHOD FOR DIAGNOSING A CATALYTIC DEVICE OF AN ENGINE EXHAUST GAS AFTER-TREATMENT SYSTEM

CROSS-REFERENCE TO RELATED APPLICATION

This application claims priority to British Patent Application No. 0920019.7, filed Nov. 16, 2009, which is incorporated herein by reference in its entirety.

TECHNICAL FIELD

The technical field relates to a method for diagnosing a catalytic device belonging to an exhaust gas after-treatment system of an internal combustion engine.

BACKGROUND

It is known that the exhaust gas after-treatment systems are generally equipped with one or more catalytic devices, which are provided for reducing the polluting emissions of the internal combustion engines. For example, the exhaust gas after-treatment system of a Diesel engine can be provided with a Diesel Oxidation Catalyst (DOC) and/or with a Lean $NO_x$ Trap (LNT) and/or a Selective Reduction Catalyst (SCR).

DOC is a catalytic device which contains catalysts, such as palladium and platinum, for reacting with hydrocarbon (HC) and carbon monoxide (CO) contained in the exhaust gas, in order to oxidize them into carbon dioxide ($CO_2$) and water ($H_2O$). LNT is a catalytic device containing catalysts, such as platinum, palladium, rhodium and absorbent such as barium based elements, which provide active sites suitable for binding the nitrogen oxides ($NO_x$) contained in the exhaust gas, in order to trap them within the device itself.

SCR is a catalytic device in which the nitrogen oxides ($NO_x$) contained in the exhaust gas are reduced into diatonic nitrogen ($N_2$) and water ($H_2O$), with the aid of a gaseous reducing agent, typically ammonia ($NH_3$) that can be obtained by urea ($CH_4N_2O$) thermo-hydrolysis and that is absorbed inside catalyst. Typically, urea is injected in the exhaust line and mixed with the exhaust gas upstream the SCR. Each catalytic device is generally characterized by a particular efficiency parameter, such as for example the efficiency of the oxidation reactions within the DOC, the nitrogen oxides storage capacity and conversion efficiency within the LNT, and the efficiency of the ammonia storage and reduction reactions within the SCR. Such efficiency parameter is often used by the engine control system for performing important actions. For example, the efficiency of the oxidation reactions within the DOC is an important parameter for the engine control system to control an Exhaust Gas Recirculation (EGR) system and to adapt particulate filter regeneration process (based on exothermal reactions).

The Exhaust Gas Recirculation (EGR) system is generally provided for routing back a certain amount of exhaust gas to the intake manifold of the engine. Such exhaust gas has the effect of reducing nitrogen oxides ($NO_x$) emission, but has also the drawback of contemporaneously increasing the oxidizing hydrocarbon (HC) and carbon monoxide (CO) emission. Therefore, the DOC efficiency may be used by the engine control system to adapt the amount of exhaust gas which can be routed back to the engine.

The nitrogen oxides ($NO_x$) storage capacity within the LNT is an important parameter for the engine control system to control the regeneration process of the LNT itself. Such regeneration process is generally provided for release and reduction of the trapped nitrogen oxides ($NO_x$) from the LNT. Therefore, the LNT storage capacity may be used by the engine control system for effectively determining when the regeneration process is needed.

The efficiency of the reduction reactions and ammonia storage capacity within the SCR are important parameters for the engine control system to control the devices which are provided for injecting the reducing agent within the exhaust line upstream the SCR. In particular, the SCR efficiency may be used by the engine control system for determining the appropriate amount of reducing agent needed to effectively reduce the nitrogen oxides ($NO_x$) within the SCR.

During the engine lifetime, the efficiency parameter of a catalytic device can be affected by progressive decrease, which is caused by aging effects. For this reason, many engine control systems are configured for estimating an aging index of the catalytic device, and for determining the efficiency parameter of the catalytic device in function of said aging index.

Conventional strategy for estimating the aging index are essentially based on temporal criteria, which for example correlate the aging index to the number of kilometers covered by the vehicle on which the engine is mounted. However, it has been found that the aging of a catalytic device is strongly affected also by the operating temperatures to which the catalytic device is subject. In particular, it has been found that a catalytic device at high operating temperatures ages faster than at low operating temperatures, to thereby resulting in a faster decrease of its efficiency parameter. Theoretically, it could be determined a maximum operating temperature, above which the efficiency parameter of the catalytic device decreases immediately at zero, and a minimum operating temperature, below which the efficiency parameter of the catalytic device does not decrease at all. The operating temperature of a catalytic device generally depends on the vehicle driving condition.

While the conventional strategies for estimating the aging index are typically calibrated on average driving conditions, the catalytic device can be subjected to higher operating temperature during urban driving cycles than during extra-urban driving cycles, for example when particulate filter regeneration is active. Therefore, if the vehicle is principally used in extra-urban driving cycles, the catalytic device is subjected to less aggressive particulate filter regeneration temperatures, so that the conventional strategies return an aging index which is higher than the real one. If, conversely, the vehicle is principally used in urban driving cycles, the catalytic device is subject to more aggressive particulate filter regeneration temperature, so that the conventional strategies return an aging index which is lower than the real one.

From the above it follows that the conventional strategies has the drawback of returning an aging index which often deviates from the real one. Such deviation involves an error in the determination of the efficiency parameter, which can cause the engine control system to perform a bad control of each process in which such efficiency parameter is implicated.

Accordingly, in view of the foregoing, at least one object is to solve, or at least to positively reduce, the above mentioned drawback with a simple, rational and inexpensive solution. In addition, other objects, desirable features and characteristics will become apparent from the subsequent summary and detailed description, and the appended claims, taken in conjunction with the accompanying drawings and this background.

SUMMARY

A method is provided for diagnosing a catalytic device of an engine exhaust gas after-treatment system. The method comprises at least a phase of estimating an aging index of the catalytic device itself. The estimation of said aging index comprises the steps of determining the catalytic device operating temperature, determining an aging factor in function of at least said determined operating temperature, determining the time period spent by the catalytic device at said determined operating temperature, calculating a contributing aging coefficient in function of said aging factor and said time period, and increasing a cumulative aging parameter by adding said contributing aging coefficient.

As a matter of fact, the cumulative aging parameter represents an equivalent age of the catalytic device, which is influenced by both the operating temperature and time period spent by the catalytic device at said operating temperature. In this way, the invention takes into consideration the real thermal stress that affect the catalytic device, to thereby achieving a more effective estimation of the aging index.

According to an embodiment, the estimation of the aging index provides for directly assuming said cumulative aging parameter as the aging index. According to another embodiment, the estimation of the aging index provides for setting a maximum value of the cumulative aging parameter, and for calculating the aging index in function of the actual value of the cumulative aging parameter and said maximum value.

The maximum value can be empirically determined as the value of the cumulative aging parameter, at which the catalytic device can be considered completely ineffective. The aging index can be calculated as the ratio between the actual value of the cumulative aging parameter and the maximum value, to thereby providing a clear indication of the level of "consumption" of the catalytic device.

According to another embodiment, the operating temperature can be determined either by direct measurement, with the aid of appropriate sensor(s), or by estimation, through an appropriate model based routine. According to another embodiment, the contributing aging coefficient is calculated by multiplying the determined aging factor and the determined time period. The aging factor can be determined from an empirically determined data set or map correlating the aging factor to at least the operating temperature.

According to another embodiment, the determination of said data set or map comprise the steps of setting a plurality of not overlapping operating temperature range, and empirically determining an aging factor to be assigned to each operating temperature range. In this way, each aging factor is the same for all the temperature values within the correspondent range. Preferably, the determination of said data set or map further comprise the step of normalizing the aging factors, by assigning unitary value to the aging factor correlated to the higher operating temperature range.

In this contest, it has been found that the aging factor can be partially affected also by the actual age of the catalytic device itself. For this reason, an embodiment provides for determining the aging factor in function of the aging index as well as of the operating temperature.

According to another embodiment of the invention, the diagnostic method further comprises the phase of determining an efficiency parameter of the catalytic device, in function of the estimated aging index. Thanks to the robust estimation of the aging index, this approach provides an effective determination also of said efficiency parameter, which can be used by the engine control system for performing a better management of the exhaust after treatment system and engine itself. For example, this approach can be applied to a DOC, in order to determine the efficiency of the oxidation reactions, which can be used by the engine control system for performing a better control of the EGR and particulate filter regeneration process (based on exothermal reactions).

This approach can also be applied to a LNT, in order to determine the nitrogen oxides storage capacity, which can be used by the engine control system for performing a better control of the LNT regeneration processes. This approach can also be applied to a SCR, in order to determine the efficiency of the reduction reactions and ammonia storage capacity, which can be used by the engine control system for performing a better control of the injections of reduction agent.

The method can be realized in the form of a computer program comprising a program code to carry out all the steps, and in the form of a computer program product comprising means for executing the computer program. The computer program product comprises a microprocessor based control apparatus for an IC engine, for example the ECU of the engine, in which the program is stored so that the control apparatus defines the invention in the same way as the method. In this case, when the control apparatus execute the computer program all the steps of the claimed method are carried out. The method can be also realized in the form of an electromagnetic signal, said signal being modulated to carry a sequence of data bits which represent a computer program to carry out all steps of the method.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to application and uses. Furthermore, there is no intention to be bound by any theory presented in the preceding background or summary or the following detailed description.

Figure 4:
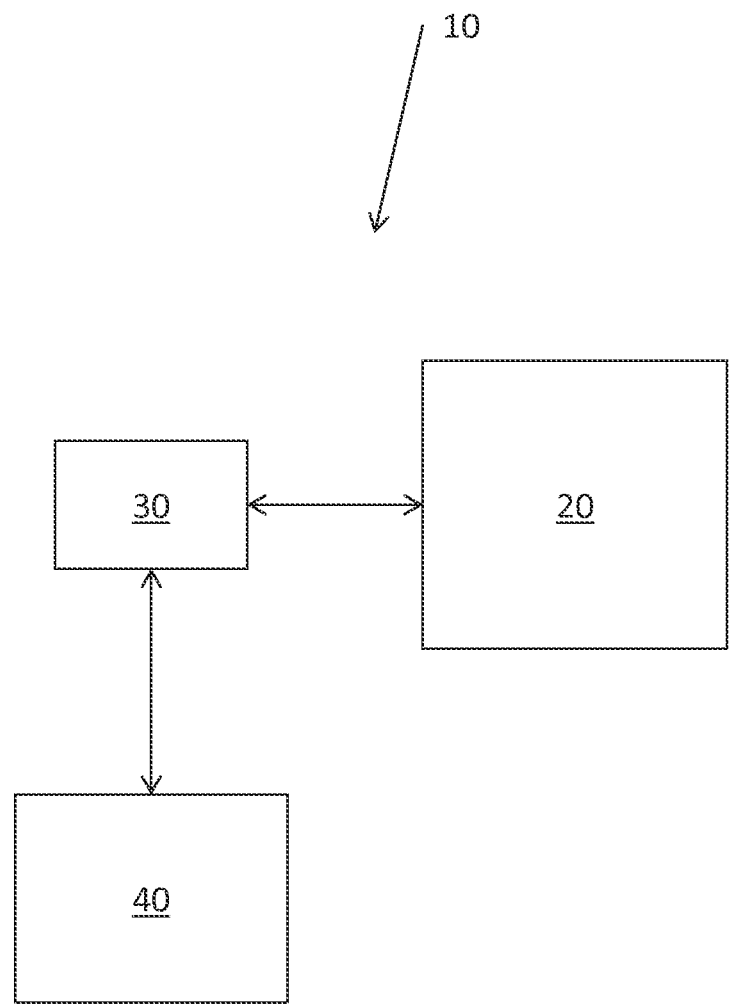
FIG. 4 is a functional block diagram of an apparatus for estimating an age index according to embodiments.

A method is provided for diagnosing a catalytic device 20 (See, FIG. 4) belonging to the exhaust gas after-treatment system of an internal combustion engine, in particular of a Diesel engine. The catalytic device can be for example a Diesel Oxidation Catalyst (DOC), as well as a Lean $NO_x$ Trap (LNT) or a Selective Reduction Catalyst (SCR).

Figure 1:
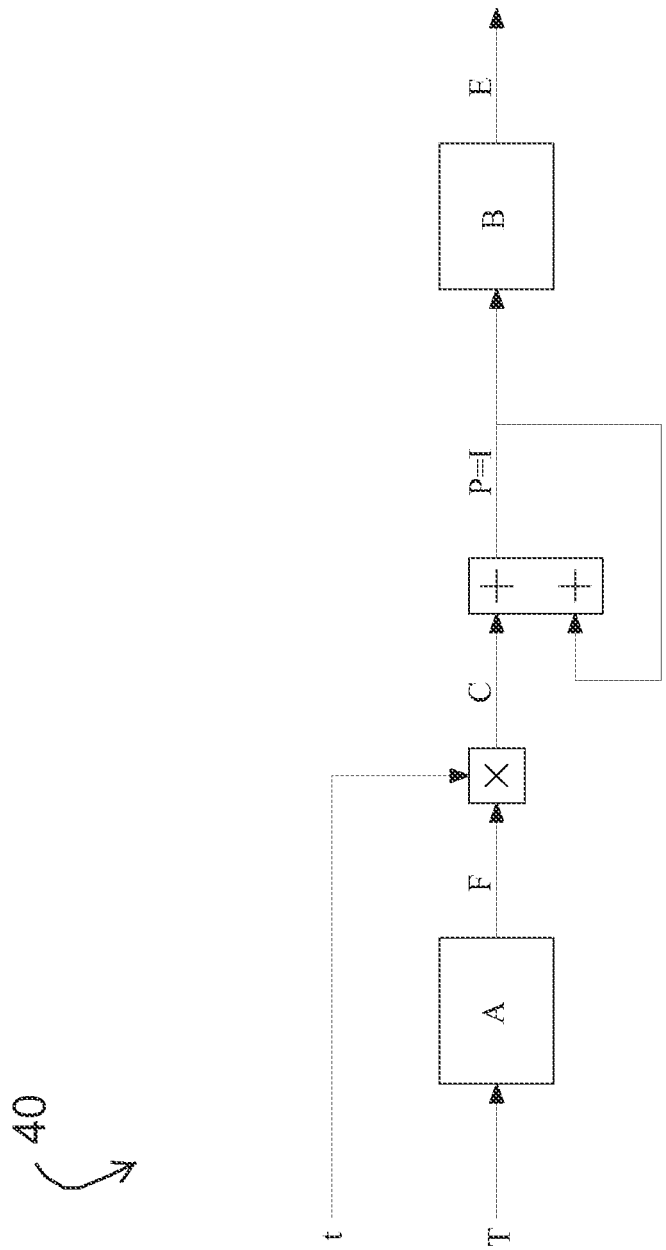
FIG. 1 is the flowchart of a diagnostic method according to a first embodiment of the invention.

A first embodiment of the invention is hereinafter described with reference to FIG. 1. The method, executed by control unit 40, generally provides for real time determining the operating temperature T to which the catalytic device is subjected, during normal engine functioning. The operating temperature T can be measured by means of appropriate sensor(s) 30, or can be estimated through an appropriate model based routine. The operating temperature T is then used for determining an aging factor F.

Such aging factor F represents the aging rate of the catalytic device at said particular operating temperature T, or likewise the impact of said particular operating temperature T on the aging of the catalytic device. The aging factor F is generally higher for high operating temperature than for low operating temperature. The aging factor F can be determined from an empirically determined data set or map A, correlating the aging factor F to the catalytic device operating temperature T.

The determination of said data set or map A is carried out during an analysis of a test catalytic device. Such analysis generally provides for setting a plurality of not overlapping operating temperature ranges, at which said catalytic device can be effectively subject during its normal functioning on a real engine system. For example, can be identified the following operating temperature ranges: I—operating temperature up to approximately 500° C.; II—operating temperature from approximately 500° C. to approximately 550° C.; III—operating temperature from approximately 550° C. to approximately 600° C.; IV—operating temperature from approximately 600° C. to approximately 650° C.; and V—operating temperature from approximately 650° C. to approximately 700° C. The analysis then provides for assigning an aging factor to each operating temperature range.

The aging factors can be determined by analyzing the rates at which the efficiency parameter of the test catalytic device decreases at the various temperature ranges, and by assigning to each temperature range an aging factor proportional to the correspondent efficiency decrease rate. Preferably, the aging factors are normalized based on the higher temperature range ("V" in the preceding example), by assigning a unitary value to the aging factor related to said higher temperature range. In this way, the aging factors correspondent to the other ranges are comprised between zero and one, and can be individually calculated as the ratio between the efficiency decrease rate, at the correspondent temperature range, and the efficiency decrease rate at the higher temperature range.

While determining the operating temperature T, the method provides for determining the time period t spent by the catalytic device at the determined operating temperature. The time period t can be expressed either in time units, such as for example in term of seconds, minutes or hours The time period t and the aging factor F are then used for calculating a contributing aging coefficient C.

Preferably, the contributing aging coefficient is calculated by multiplying the time period and the aging factor:

$$C = F \cdot t$$

The contributing aging coefficient C represents the contribution to the aging of the catalytic device that is caused by said particular operating temperature T during the correspondent time period t.

Afterwards, the method provides for adding the contributing aging coefficient C to a cumulative aging parameter P. The cumulative aging parameter P is set to zero when the catalytic device is new or, more generally, when the efficiency of the catalytic device is at maximum level, and progressively increases by the addition of the aging coefficients C. As a matter of fact, the cumulative aging parameter P represents an equivalent age of the catalytic device. Such equivalent age is "weighted" on the base of the operating temperatures, so that the time spent by the catalytic device at high temperature increases the equivalent age more than the time spent at low temperature.

The cumulative aging parameter P is then directly assumed as an aging index I for the present catalytic device. The aging index I is finally used for determining an efficiency parameter E of the catalytic device. The efficiency parameter E can be for example the efficiency of the oxidation reactions, in case of a DOC, the nitrogen oxides storage capacity and conversion efficiency, in case of a LNT, and the efficiency of the reduction reactions and ammonia storage capacity, in case of a SCR. The efficiency parameter E can be determined from an empirically determined data set or map B correlating the efficiency parameter E to the aging index I. Afterwards, the determined efficiency parameter E of the catalytic device can be involved in many other processes of the engine system management.

The previously disclosed method steps are preferably cyclically repeated during the engine functioning. In this way, the method effectively provide for continuous monitoring the operating temperature T, the aging index I, and the efficiency parameter E of the catalytic device.

Figure 2:
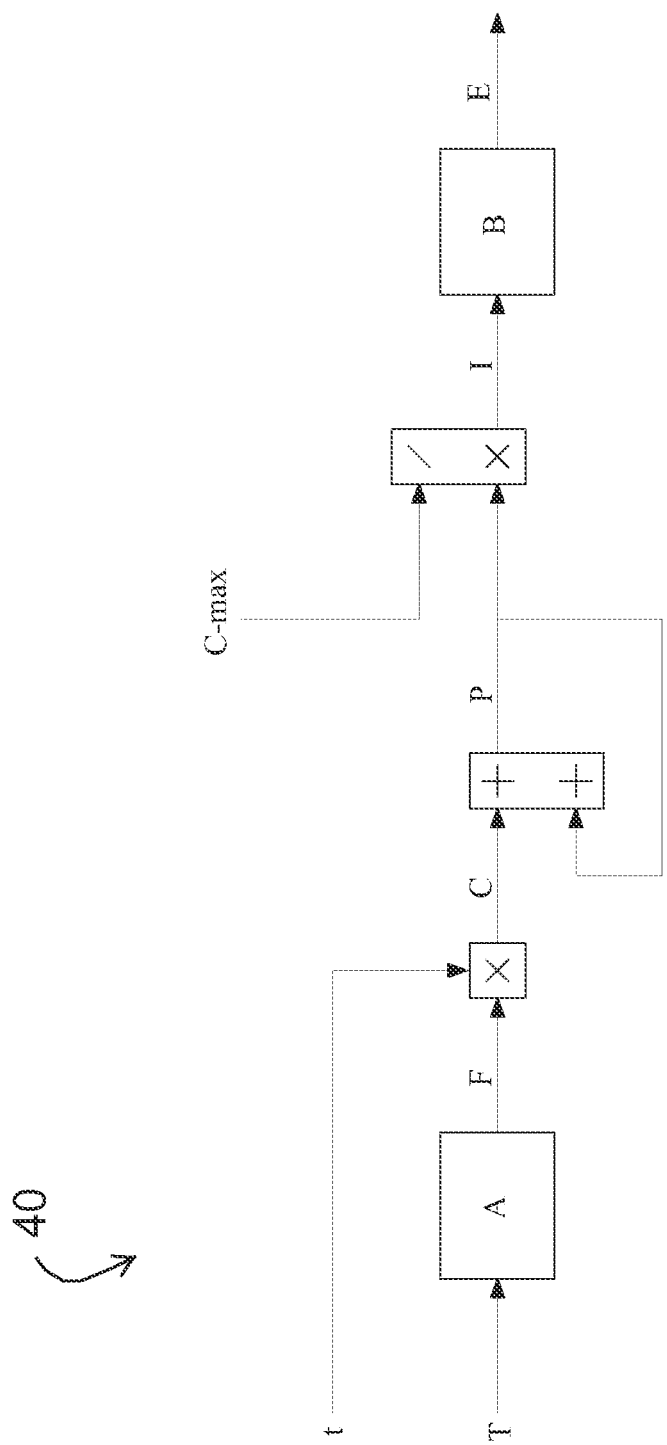
FIG. 2 is the flowchart of a diagnostic method according to a second embodiment of the invention.

FIG. 2 illustrates a diagnostic method executed by control unit 40 (See, FIG. 4) according to a second embodiment. This second embodiment differs from the first one only in the step of determining the aging index I of the catalytic device 20. As a matter of fact, the method according to this second embodiment provides for setting a maximum value C-max for the cumulative aging parameter P of the catalytic device, and for calculating the aging index I in function of the said maximum value C-max and the actual value of the cumulative aging parameter P.

The maximum value C-max can be empirically determined as the value of the cumulative aging parameter P, at which the catalytic device is considered totally ineffective. The aging index is calculated as the ratio between the actual value of the cumulative aging parameter and its maximum value:

$$I = \frac{P}{C-\max}$$

to thereby providing a clear and direct indication of the actual level of "consumption" of the catalytic device. The aging index I is then used for determining the efficiency parameter E of the catalytic device, as explained in the description of the first embodiment.

The method steps are preferably cyclically repeated during the engine functioning, in order to continuous monitoring operating temperature, aging index and the efficiency parameter.

Figure 3:
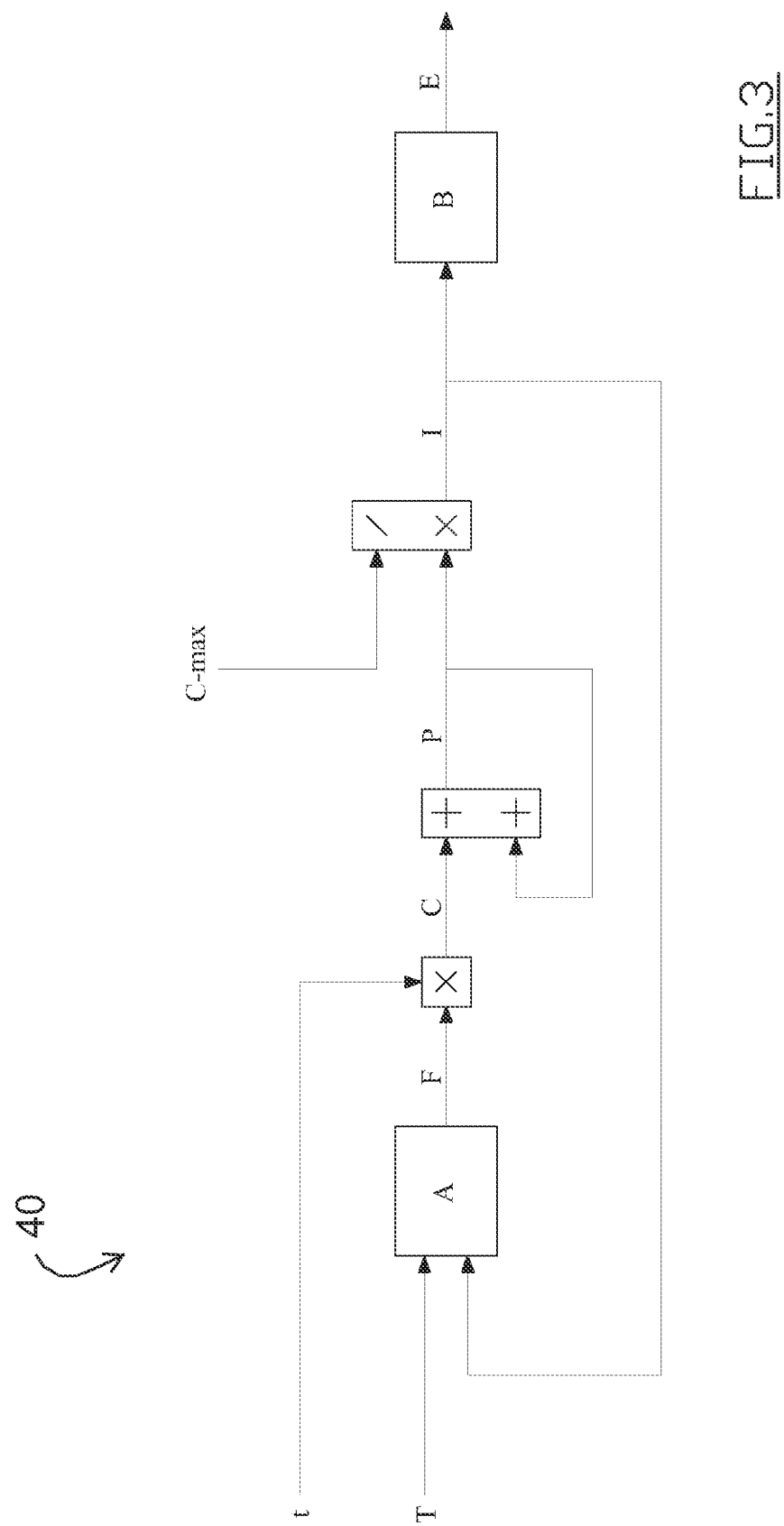
FIG. 3 is the flowchart of a diagnostic method according to a third embodiment of the invention.

FIG. 3 illustrates a diagnostic method executed by control unit 40 (See, FIG. 4) according to a third embodiment. This third embodiment takes into account that the aging rate of a catalytic device 20 at a particular operating temperature, or likewise the impact of said particular operating temperature on the aging of the catalytic device, can vary in function of the actual "age" of the catalytic device itself. Therefore, the third embodiment of the invention differs from the preceding ones in that the method provides for determining the aging factor F, not only in function of the operating temperature T to which the catalytic device is subjected, but also in function of the actual value of the aging index I.

In this case, the aging index I is calculated as explained for the second embodiment. As a matter of fact, the aging index I can be used for properly correct an aging factor F, which is provided by the empirically determined data set or map A described in the first embodiment.

Alternatively, the aging factor F can be determined from other empirically determined data set or map A, which directly correlates the aging factor to both the operating temperature T and the aging index I. In this way, the method according to this third embodiment of the invention introduces an accuracy increase in the estimation of the catalytic device aging index I. The aging index I is then used for determining the efficiency parameter E of the catalytic device, as explained in the description of the first embodiment.

The method steps are preferably cyclically repeated during the engine functioning, in order to continuous monitoring operating temperature, aging index and the efficiency parameter.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for estimating an aging index of a catalytic device using a contributing aging coefficient, comprising:
    determining an operating temperature of the catalytic device by a sensor;
    determining an aging factor as a function of at least said operating temperature;
    determining a time period spent by the catalytic device at said operating temperature;
    calculating the contributing aging coefficient as a function of said aging factor and said time period; and
    increasing a cumulative aging parameter via a processor by adding said contributing aging coefficient.

2. The method according to claim 1, further comprising assuming said cumulative aging parameter as the aging index.

3. The method according to claim 1, further comprising:
    setting a maximum value of the cumulative aging parameter; and
    calculating the aging index as a function of the cumulative aging parameter and said maximum value.

4. The method according to claim 3, further comprising calculating said aging index as a ratio between the cumulative aging parameter and said maximum value.

5. The method according to claim 1, wherein the determining the operating temperature comprises measuring the operating temperature.

6. The method according to claim 1, wherein the determining the operating temperature comprises estimating the operating temperature.

7. The method according to claim 1, wherein calculating the contributing aging coefficient comprises multiplying the aging factor and the time period.

8. The method according to claim 1, wherein the determining the aging factor comprises correlating the aging factor at least to the operating temperature.

9. The method according to claim 8, wherein the correlating the aging factor at least to the operating temperature comprises:
    setting a plurality of non-overlapping operating temperature ranges, and
    empirically determining the aging factor to be assigned to each operating temperature range.

10. The method according to claim 1, wherein determining the aging factor comprises determining as a function of the aging index.

11. The method according to claim 1, wherein the method further comprises determining the cumulative aging parameter of the catalytic device as a function of the aging index.

12. A non-transient computer readable medium embodying a computer program product, said computer program product comprising a program for estimating an aging index of a catalytic device, the program configured to:
    determine an operating temperature of the catalytic device from a sensor;
    determine an aging factor as a function of at least said operating temperature;
    determine a time period spent by the catalytic device at said operating temperature;
    calculate a contributing aging coefficient as a function of said aging factor and said time period; and
    increase a cumulative aging parameter by adding said contributing aging coefficient.

13. The computer readable medium embodying the computer program product according to claim 12, the program further configured to assume said cumulative aging parameter as the aging index.

14. The computer readable medium embodying the computer program product according to claim 12, the program further configured to:
    set a maximum value of the cumulative aging parameter; and
    calculate the aging index as a function of the cumulative aging parameter and said maximum value.

15. The computer readable medium embodying the computer program product according to claim 14, the program further configured to calculate said aging index as a ratio between the cumulative aging parameter and said maximum value.

16. The computer readable medium embodying the computer program product according to claim 12, wherein the program is further configured to determine the operating temperature at least using a measurement the operating temperature.

17. The computer readable medium embodying the computer program product according to claim 12, wherein the program is further configured to determine the operating temperature with at least an estimation of the operating temperature.

18. The computer readable medium embodying the computer program product according to claim 12, wherein the program is further configured to calculate the contributing aging coefficient at least using a multiplication of the aging factor and the time period.

19. The computer readable medium embodying the computer program product according to claim 12, wherein the program is further configured to determine the aging factor at least using a correlation with at least to the operating temperature.

20. The computer readable medium embodying the computer program product according to claim 19, wherein the program is further configured to correlate the aging factor at least to the operating temperature by:
    setting a plurality of non-overlapping operating temperature ranges; and
    empirically determining the aging factor to be assigned to each operating temperature range.

21. The computer readable medium embodying the computer program product according to claim 12, wherein the program is further configured to determine the aging factor as a function of the aging index.

22. The computer readable medium embodying the computer program product according to claim 12, wherein the program is further configured to determine the cumulative aging parameter of the catalytic device as a function of the aging index.

23. An apparatus for estimating an aging index of a catalytic device, the apparatus comprising:

a sensor configured to sense an operating temperature of the catalytic device; and a control unit configured to receive the operating temperature, the control unit further configured to:
- determine an aging factor as a function of at least said operating temperature;
- determine a time period spent by the catalytic device at said operating temperature;
- calculate a contributing aging coefficient as a function of said aging factor and said time period; and
- increase a cumulative aging parameter by adding said contributing aging coefficient.

24. The apparatus according to claim 23, wherein the control unit is further configured to assume said cumulative aging parameter as the aging index.

25. The apparatus according to claim 23, wherein the control unit is further configured to:
- set a maximum value of the cumulative aging parameter; and
- calculate the aging index as a function of the cumulative aging parameter and said maximum value.

26. The apparatus according to claim 25, wherein the control unit is further configured to calculate said aging index as a ratio between the cumulative aging parameter and said maximum value.

27. The apparatus according to claim 23, wherein the control unit is further configured to determine the operating temperature at least using a measurement the operating temperature.

28. The apparatus according to claim 23, wherein the control unit is further configured to determine the operating temperature with at least an estimation of the operating temperature.

29. The apparatus according to claim 23, wherein the control unit is further configured to calculate the contributing aging coefficient at least using a multiplication of the aging factor and the time period.

30. The apparatus according to claim 23, wherein the control unit is further configured to determine the aging factor at least using a correlation with at least to the operating temperature.

31. The apparatus according to claim 30, wherein the control unit is further configured to correlate the aging factor at least to the operating temperature by:
- setting a plurality of non-overlapping operating temperature ranges; and
- empirically determine the aging factor to be assigned to each operating temperature range.

32. The apparatus according to claim 23, wherein the control unit is further configured to determine the aging factor as a function of the aging index.

33. The apparatus according to claim 23, wherein the control unit is further configured to determine the cumulative aging parameter of the catalytic device as a function of the aging index.

* * * * *